United States Patent [19]

Muramatsu et al.

[11] Patent Number: 5,043,873
[45] Date of Patent: Aug. 27, 1991

[54] METHOD OF PARALLEL PROCESSING FOR AVOIDING COMPETITION CONTROL PROBLEMS AND DATA UP DATING PROBLEMS COMMON IN SHARED MEMORY SYSTEMS

[75] Inventors: Akira Muramatsu, Kawasaki; Kousuke Sakoda, Hino; Ikuo Yoshihara, Tama; Kazuo Nakao, Sagamihara; Makoto Nohmi, Kawasaki; Naoki Hamanaka, Tokyo; Shigeo Nagashima; Teruo Tanaka, both of Hachioji, all of Japan

[73] Assignee: Hitachi, Ltd., Tokyo, Japan

[21] Appl. No.: 395,444

[22] Filed: Aug. 17, 1989

Related U.S. Application Data

[62] Division of Ser. No. 85,646, Aug. 14, 1987.

[30] Foreign Application Priority Data

Sep. 5, 1986 [JP] Japan .................................. 61-209253
Mar. 18, 1987 [JP] Japan .................................. 62-61018

[51] Int. Cl.$^5$ ............................................. G06F 15/16
[52] U.S. Cl. .................................. 364/200; 364/228.9; 364/229.2; 364/230.3; 364/240.1; 364/241.8
[58] Field of Search ................................. 364/200, 900

[56] References Cited

U.S. PATENT DOCUMENTS

| | | | |
|---|---|---|---|
| 3,662,401 | 5/1972 | Collins et al. | |
| 4,228,496 | 10/1980 | Katzman et al. | 364/200 |
| 4,412,303 | 10/1983 | Barnes et al. | 364/200 |
| 4,672,535 | 6/1987 | Katzman et al. | 364/200 |

FOREIGN PATENT DOCUMENTS

| | | |
|---|---|---|
| 0127772 | 12/1984 | European Pat. Off. . |
| 0258736 | 3/1988 | European Pat. Off. . |
| 2561009 | 9/1985 | France . |
| 60-3751 | 1/1985 | Japan . |

OTHER PUBLICATIONS

"The IBM Research Parallel Processor Prototype (RP3) Introduction and Architecture", Proc. of the 1985 ICPP (1985), by G. F. Pfister et al.

"Cedar, COMPCON '84 Spring", D. D. Gajski et al., pp. 306-309, 1984.

"The Piecewise Data Flow Architecture: Architectural Concepts", Joseph E. Requa, IEEE Transactions on Computers, vol. C-32, No. 5, May 1983.

"High-Speed Method in Computer for Technological Computation", Nikkei Electronics, Aug. 3, 1981, pp. 131-132.

"OCCAM Programming Manual", 3.3.2, 3.3.3, 3.5.2, and 3.12.4.

Primary Examiner—Gareth D. Shaw
Assistant Examiner—John Loomis
Attorney, Agent, or Firm—Fay, Sharpe, Beall, Fagan, Minnich & McKee

[57] ABSTRACT

A plurality of elemental processors each include a local memory for storing data and task programs and an execution section for executing the task programs. A communications section transfers data among the processors. In a method of parallel processing with these elemental processors, a task program is executed in one of the processors. A detection operation is conducted to determine whether the data from the task program is to be copied to the local memories of other processors. The detection is based on predetermined information which is stored in the local memory of the processor which performs the task program and indicates which of the other processors will need the data. The detection also determines which of the other processors that will require access to the data are ready to receive the data. Concurrently and in parallel with the execution of the task program, the data is transmitted to each of the elemental processors that are awaiting the data with only a write instruction and without any communications instruction.

2 Claims, 13 Drawing Sheets

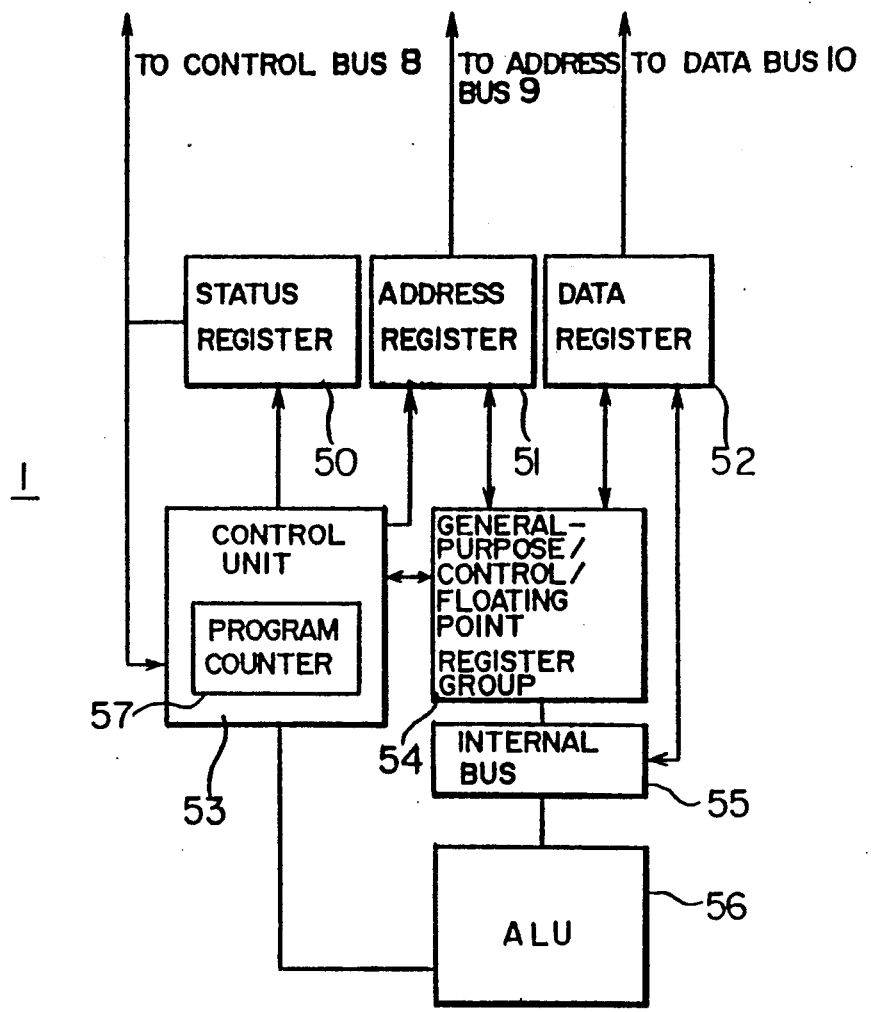

FIG. 6A

| ELEMENT PROCESSOR NUMBER | WRITE | LOCAL MEMORY ADDRESS | DATA |
|---|---|---|---|

FIG. 6B

| ELEMENT PROCESSOR NUMBER | READ | LOCAL MEMORY ADDRESS | DESTINED ELEMENT PROCESSOR NUMBER |
|---|---|---|---|

FIG. 6C

| ELEMENT PROCESSOR NUMBER | RETURN | DATA |
|---|---|---|

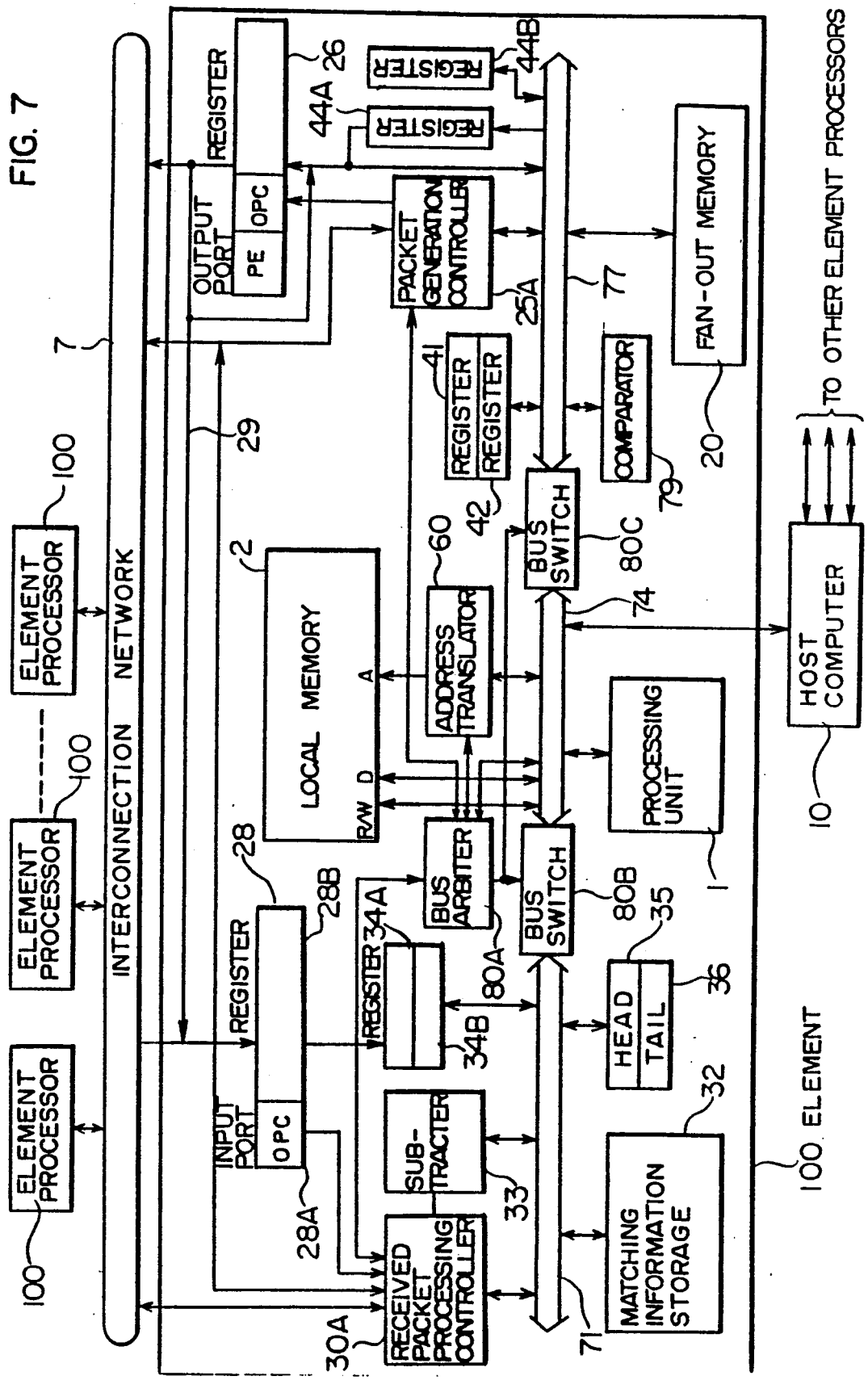

```
      DO 10 I = 1,3
      DO 10 J = 1,3
      A(I,J) = B(I,J) + C(J)
10    CONTINUE
      DO 20 I = 1,3
      DO 20 J = 1,3
      X(I,J) = A(I,J)*D
20    CONTINUE
      DO 30 I = 1,3
      DO 30 J = 1,3
      Y(I,J) = Y(I-1,J) + X(I,J)
30    CONTINUE
```

METHOD OF PARALLEL PROCESSING FOR AVOIDING COMPETITION CONTROL PROBLEMS AND DATA UP DATING PROBLEMS COMMON IN SHARED MEMORY SYSTEMS

This is a division of co-pending application Ser. No. 085,646 filed on Aug. 14, 1987.

BACKGROUND OF THE INVENTION

Generally, in a parallel computer, a program is divided into a plurality of unit process programs (also called task), and each element processor is assigned with a part of the unit process programs and executes them in parallel with the execution by other element processors.

One of fundamental subjects of the construction of a parallel computer is how to distribute and share data. The distribution of data means that the data is distributed and allocated in physically distributed memory modules. The share of data means that the physically distributed and logically same data is accessed by a plurality of unit process programs.

Owing to the development of recent semiconductor technology, a large scaled parallel computer (with more than several hundreds and thousands element processors) heretofore not considered as available is not technically possible. With the advent of large scaled parallel computers, a parallel computer having a distributed type memory architecture has been desired, because a tightly coupled parallel computer with a centralized memory in which element processors physically share a memory and read data from and write data in the memory via buses or switches has the following problems: Memory access speed becomes low due to data transfer by way of bulky buses and switches; and there occurs access contention due to bank conflict. A first subject is how to assign data or program to each element processor of a distributed type parallel computer. According to a prior art (hereinafter called a first prior art) disclosed in "The IBM research Parallel processor Prototype (RP3) Introduction and Architecture, Proc. of the 1985 ICPP (1985), by G. F. Pfister, et al.", each element processor has a local memory to distributively store data or program to be processed. Addressing of distributed memories is generally executed using the local addressing scheme and the global addressing scheme. When the former, each element processor can read only its own local memory, while with the latter, each element processor can read the local memory of a desired element processor. The first prior art can adopt the both methods. Shared data, i.e., data accessible by a plurality of element processors, is located at a space (global space) accessible using the global addressing scheme. It is necessary for the access of data in the global space to translate the global address into the addresses of a local memory. To this end, the first prior art uses an interleaving translation by which consecutive data words in the global address space are translated sequentially, distributively and cyclically into the space of each element processor by using lower bits of an address code as an element processor number.

According to the global addressing scheme, each address determines one physical location. Thus, the share of data becomes the share of physical entity. In case of distributed memories, the distance (access time) by each element processor to a physical location differs. Therefore, if the element processor assigned with data differs from the element processor assigned with a program for accessing the data, the processing performance is considerably deteriorated. This problem can be solved by providing near the processor a cache memory for temporarily storing data. However, this method is hardly adopted due to so-called cache coherency that parallel read/write control of shared data in parallel cache memories is generally difficult. Namely, if data is changed by its element processor, and another element processor stores the data in its cache memory, the contents of data of the both element processors become different from and contradictory to each other. To avoid this problem, each time an element processor changes data, such change is broadcast to all the other element processors to make invalid the same data stored in the cache memories as that before the change. It takes a considerably long time to effect such broadcast and invalid processing in a large scaled parallel computer. Consequently, the first prior art basically prohibits the storage of shared data in a cache memory. There is known another prior art (hereinafter called a second prior art) for holding data near an element processor accessing the data, as described in "D. D. Gajski, et al: Cedar, COMPCON '84 Spring, pp. 306 to 309, 1984". According to the second prior art, there are provided a centralized type shared memory accessible by all element processors and a local memory provided for each element processor. Prior to executing unit process program by an element processor, the data required by the program is transferred from the shared memory to the local memory of the element processor. The results obtained through the execution of the program is again loaded in the shared memory. A unit process program is assumed as constructed of a series of instructions of about one iteration loop procedure.

The problems associated with the first prior art are as follows:

(1) The division and mapping of data (i.e., assignment of each part of the divided data to some element processor) is performed mechanically so that the parallel processing logics are not necessarily reflected. Therefore, it often happens that the data required by a unit process program assigned to an element processor is also assigned to other element processor. In such a case, the memories in the other element processors must be read through the network, resulting in not negligible delay.

(2) Address space becomes insufficient. Assuming that all element processors share a single address space, there arises a case where a real space exceeds a virtual space as the total number of element processors increases. For example, a system made of 512 element processors each having a 4 MB real memory has a capacity of 2 GB, which corresponds to a space allowed to be designated by the 31 bit addressing scheme adopted by a present typical, general-purpose large computer. Therefore, an increase in the number of element processors cannot be expected unless the addressing scheme is changed. In view of this, even the first prior art considers to use local space. However, there is not disclosed a method of sharing data while using local space as much as possible.

The following four problems are found in the second prior art.

(1) It takes time to transfer data between a shared memory and each local memory.

(2) The data shared by a plurality of unit process programs executed in parallel by different element processors must be located in a shared memory, otherwise a specific synchronization mechanism is required.

(3) Address space becomes insufficient similar to the first prior art.

(4) Since the execution order of a plurality of unit process programs by each element processor is controlled by a single control processor, the control load is concentrated on the control processor thus arising a fear of performance deterioration.

SUMMARY OF THE INVENTION

It is a first object of the present invention to provide a parallel computer capable of loading the data required by each element processor as much as possible in a local memory provided at the processor, and also capable of reducing a data transfer time necessary for the use of the data by another element processor.

It is a second object of the present invention to provide a parallel computer capable of managing the selection and activation of a next task to be executed by each element processor, without concentrating such control on a single control processor.

To achieve the first object of the present invention, there are provided a processor for executing a program constructed such that when a memory is accessed, an address belonging to the local address space assigned to each element processor is designated; and means for detecting, when a memory write instruction is executed by the processor, whether the memory address designated by the instruction coincides with a predetermined address, sending an address belonging to a local address space, of another predetermined element processor, predetermined corresponding to the prodetermined address and the data written upon the write instruction into the other element processor when the coincidence is detected, and causing the data to be written as a copy data.

To achieve the second object of the present invention, each element processor is provided with task activation control means for discriminating a next task to be executed by each element processor.

BRIEF DESCRIPTION OF THE DRAWINGS

FIG. 2 is a schematic block diagram showing the processor (1) of the computer shown in FIG. 1; (110) used by the computer shown in FIG. 1:

FIG. 6A shows a format of a write packet used by the computer shown in FIG. 1;

FIG. 6B shows a format of a read packet used by the computer shown in FIG. 1;

FIG. 6C shows a format of a return packet used by the computer shown in FIG. 1;

FIG. 7 is a block diagram showing a second embodiment of the parallel computer according to the present invention;

DESCRIPTION OF THE PREFERRED EMBODIMENTS

Preferred embodiments of the present invention will be described in detail with reference to the accompanying drawings.

Figure 1:
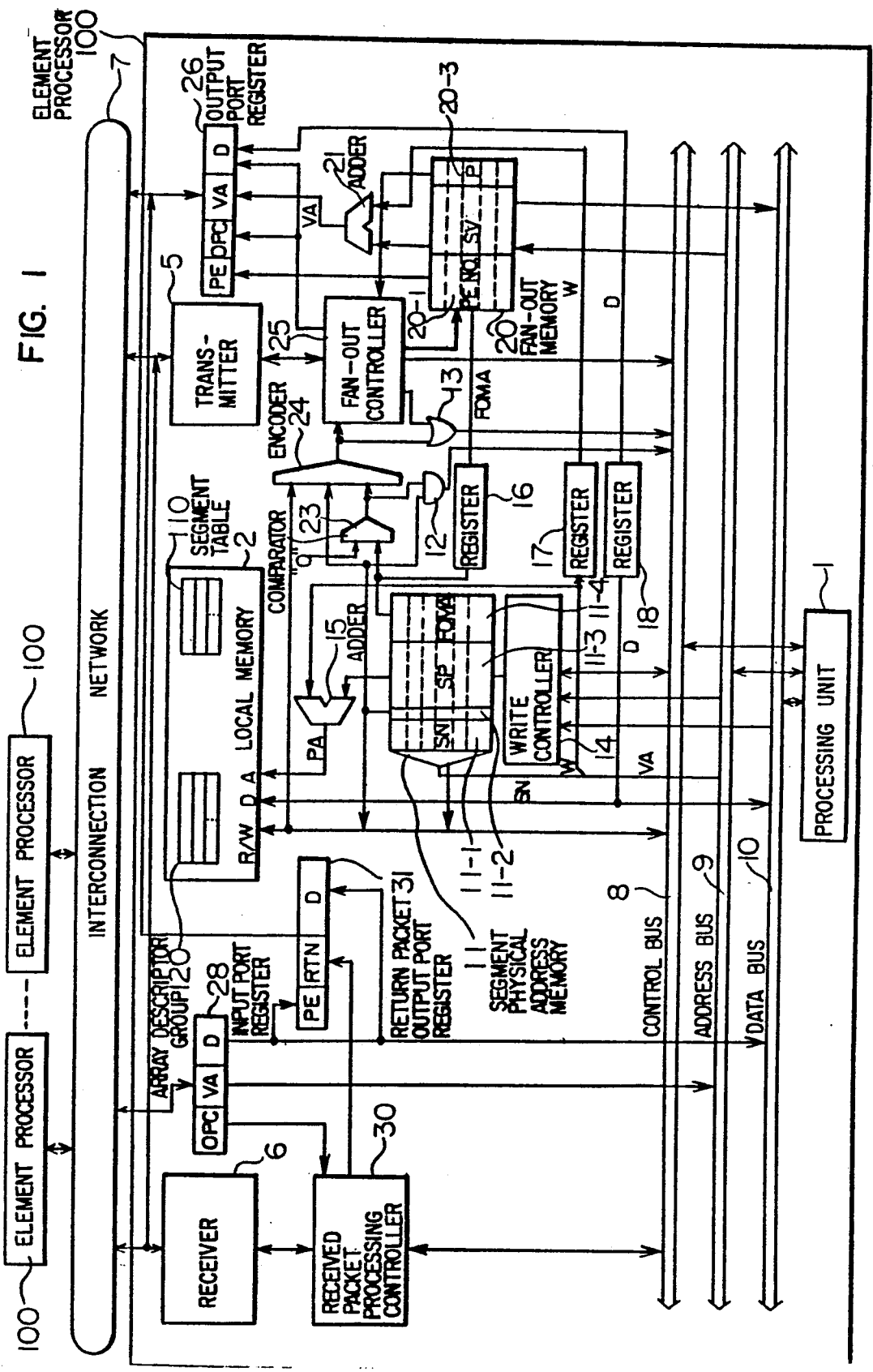
FIG. 1 is a block diagram showing a first embodiment of the parallel computer according to the present invention.

FIG. 1 shows an embodiment of a data decentralized management apparatus according to the present invention.

An element processor 100 comprises a processing unit 1 for executing a program, a local memory 2 for storing data, a segment real address memory 11 for use in translating a virtual address designated by an instruction into a real address, an adder 15, a fan-out memory 20 for storing the number of another element processor and the address of its local memory 2, an adder 21, a fan-out controller 25, a receiver 5 and a transmitter 6 for the communication to other element processors, a received packet processing controller 30, an input port register 28, an output port register 26, a return packet output port register 31, a control bus 8, an address bus 9, a data bus 10, and the like. A plurality of such element processors are connected to an interconnection network 7. The processing unit 1 comprises, as shown in FIG. 2, a status register 50, an address register 51, a data register 52, a control unit 53 including a program counter 57, a register group 54 constructed of general-purpose registers, control registers and floating point registers, an internal bus 55, and an ALU 56 for performing an arithmetic and logic operation and a floating point operation. The control unit 53 has a function of sequentially fetching instructions in the local memory 2 (FIG. 1) and controlling the execution of a fetched instruction, which is essentially the same as of the processor of a known general-purpose computer. The fan-out controller 25 and the received packet processing controller 30 shown in FIG. 1 contain microprograms therein and constructed such that predetermined control signals are outputted in a predetermined sequence in response to various inputs, as will be later described.

In this embodiment, an access instruction for the local memory 2 to be executed by the processing unit 1 designates a virtual address instead of a physical address of the local memory 2. The address designation is performed by a known method. For example, in case of an instruction for reading data from the local memory 2 and loading the data in one of registers, e.g., a general-purpose register, or in case of an instruction for storing the contents of the register in the local memory 2, the displacement and the number of the general-purpose register used as a data register as well as those of two general-purpose registers used as a base register and an index register are designated. In this case, the virtual address for use in addressing the local memory 2 is obtained based on the sum of the displacement and the contents of the base and index registers. Such address addition is executed by the control unit 53 and the contents thereof are set in the address register 51. An instruction of another format may be used, for example, an instruction for designating the contents of a single general-purpose register as a virtual address. In this embodiment, each element processor is provided with a virtual address space of a fixed size. A memory access instruction to be executed by each element processor designates a virtual address belonging to the virtual address space. A virtual address generated by each element processor 100 is translated into a physical address by using the contents of the segment table 110 provided for each local memory 2. The segment table 110 is constructed, as shown in FIG. 3, of a field 110-1 for storing the segment number SN of each segment of a virtual address space of the element processor, an invalid bit field 110-2, a field 110-3 for storing the segment physical address for the segment in the local memory 2 and zero. The fan-out memory 20 stores the number of another element processor to which the data written in the local memory 2 is transferred, and a top virtual address (hereinafter called a segment virtual address) of the segment assigned to the data in the other element processor Writing the data to the other element processor is instructed using the contents of the fan-out memory 20.

Data and program assignment to each element processor, the virtual address, the physical address, the contents of the segment table 110 and the fan-out memory 20 are decided beforehand as in the following manner (1) In case of array data, e.g., A (I, J), (I = 1 to N, J = 1 to M), partial array data, e.g., A (1, *), A (2, *) .. . (where * represents J = 1 to M) constructed of elements with a same index is sequentially assigned in the predetermined order to different element processors. In this case, different elements in a same partial array are assigned to a same segment. Data other than array data is not necessary to be distributed so that the data is assigned to a predetermined element processor.

(2) A program is divided beforehand into a plurality of unit process programs (hereinafter called tasks) in order to positively use the advantage of parallel processing.

(3) A task for defining (i.e., determining the data value) partial array data or data other than array data assigned to each element processor as in (1) is assigned to a virtual address space (hereinafter may merely called a local space) of the same element processor. However, in case of array data addressed by an indirect index, e.g., K (L(I), J) where although a task refers to a partial array of the array but which partial array is to be accessed is decided only when the task is executed, all the array data are assigned to the local space of the element processor to which the task is assigned.

(4) Next, if it is clear from the program that a task of an element processor (B) refers (i.e., uses the value) to the data assigned to and determined the value of which by another element processor (A), the data (hereinafter called copy data) having the same value as that in the element processor (A) is assigned to the local space of the element processor (B).

(5) The virtual top address (hereinafter simply called a virtual segment address) of the segment for each partial array data assigned to each element processor is stored in one of array descriptors 120 in the local memory 2 of each element processor.

(6) The physical address at the local memory 2 corresponding to the virtual address to which data or program instruction is assigned is determined. In this case, consecutive virtual addresses in a segment at the virtual space are made in correspondence with consecutive physical addresses. In case of array data accessible by an indirect index as previously described, physical addresses of element processor assigned with tasks for all the array elements. For example each partial array data of the array is assigned with the physical address of a different element processor. In this case, for the element processor assigned with a partial array, it becomes necessary to assign not only the partial array but all the other partial arrays to its own virtual address space.

(7) Next, data for the segment table 110 and the fan-out memory 20 are produced.

By the assignment of physical addresses through the method described at (6) the correspondence between the top address of each segment of virtual address space and the physical address can be established. Thus physical address is called a segment physical address and is stored in the field 110-3 of the segment table. At this time, the invalid bit field 110-2 of the segment is set with "0".

On the other hand, as described with array data addressable by an indirect index, if all the elements of an array are assigned to virtual address space and only some partial arrays are assigned to a physical address for an element processor, a although on entry is formed in the segment table for the segment assigned with one partial array having a top physical address similarly to the above, the invalid bit field 110-2 of the segment table 110 is set with "1" for the segment assigned with a partial array without having a top physical address to thereby indicate that a corresponding physical address of the local memory of the element processor is not present. In addition, an entry address of the fan-out memory 20 is stored in the field 110-4. In this entry of the fan-out memory 20, an element processor number PENO and a segment virtual address SV of a partial array for the element processor are stored.

Further, where a copy data of data (original data) assigned to an element processor (e.g., A) is assigned to another element processor (e.g., B), the PE number of the other element processor (B) and the segment virtual address SV assigned to the copy data are stored in an entry of the fan-out memory 20 of the element processor (A). The entry address FOMA is stored in the fan-out memory address field 110-4 of the segment table at the segment assigned with the original data.

If the copy data is assigned to a plurality of element processors, similar information on the remaining element processors are stored in other entries of the fanout memory, with the latter entry address P being stored in the former entry pointer field. Accordingly, information on copy destinations of a same data is stored in the fan-out memory 20 in list form.

Figure 4:
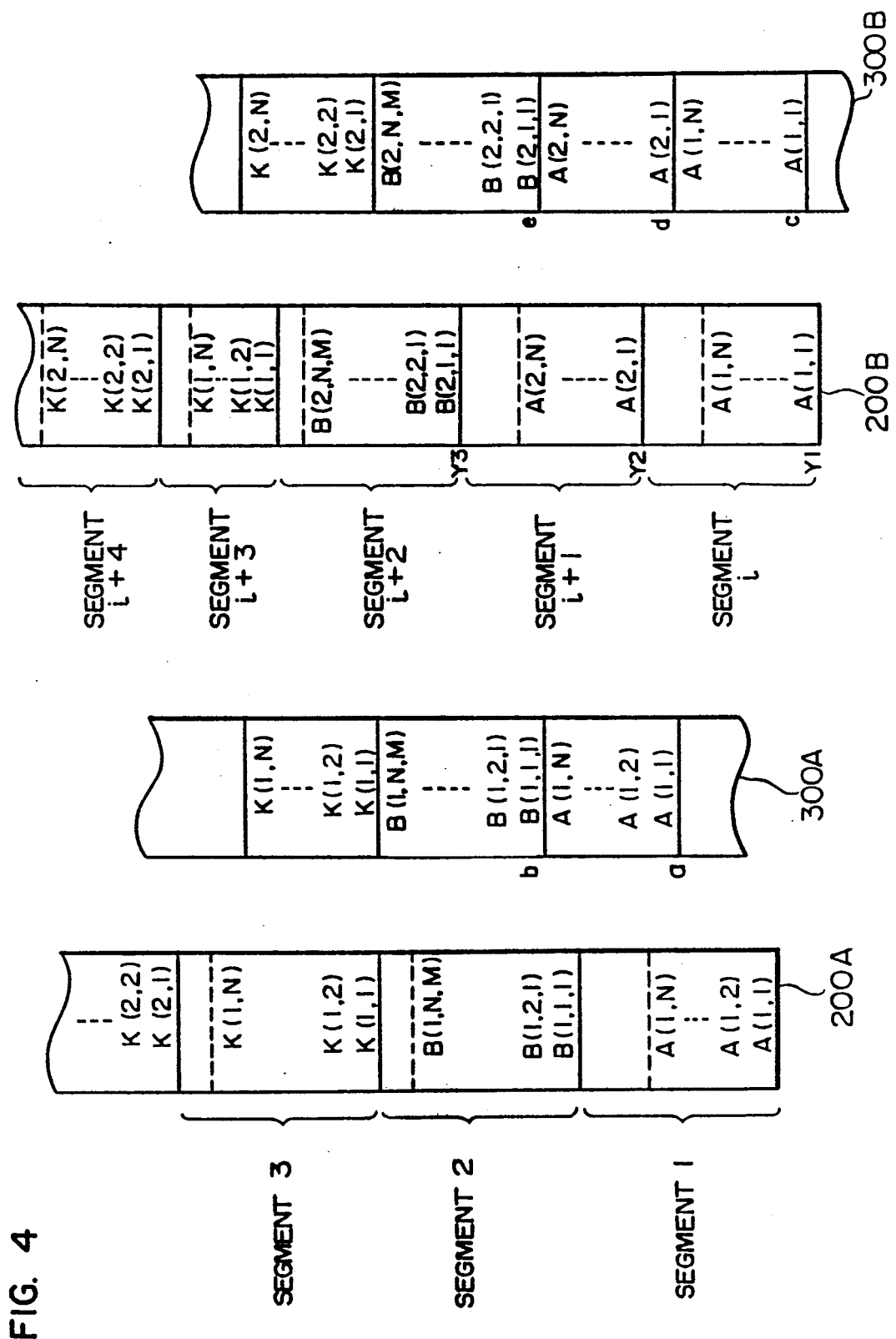
FIG. 4 shows an example of data assignment to virtual and physical spaces of two element processors shown in FIG. 1.

FIG. 4 shows an example of mapping the segments assigned to virtual spaces to the physical spaces. In this example, it is assumed that two arrays A (I, J) and B (I, J, K) are divided into partial arrays with respect to the first index and assigned to the virtual space of each element processor. In the Figure, 200A and 200B represent the virtual address spaces of the element processors 1 and 2, respectively. 300A and 300B represent the physical address spaces of the element processors, respectively. Array A (1, *) where * represents J = 1 to N is defined by the element processor 1 and also referred by the element processor 2. In other words, there is a shared relation therebetween. Therefore, the array A (1, *) is assigned to both virtual spaces. A (1, *) is mapped to the consecutive area with top address a of the physical address space of the element processor 1, each element data being stored at an address obtained by adding an offset determined by the second index to the address a. Another segment B (1, *, *) on the virtual address space of the element processor 1 is mapped to the area starting from address b of the physical address space, the b address is a top address of an area succeeding the store area of A (1, *) starting from the address a. As above, the data areas assigned to the virtual address space with some intervals therebetween area assigned to the physical address space with no intervals therebetween.

In addition, although all the partial arrays K (1, *), K (2, *), . . . of the array data K (I, J) are assigned to the virtual address space 200A of the element processor 1, only one partial array K (1, *) is assigned to the corresponding physical address space 300A. Similarly, partial array K (2, *) is assigned to the physical address space 300B and all the partial arrays are assigned to the virtual address space 200B of the element processor 2. This is the case where tasks accessing array data K (L(I), J) by an indirect index are assigned to each element processor.

Referring back to FIG. 1, the segment physical address memory 11 is used for storing those entries the element processor refers to constantly among entries in the segment table 110 of the local memory 2. The memory 11 is constructed of a so-called content addressable memory and has four fields 11-1, 11-2, 11-3 and 11-4 similar to those of the segment table 110. The address translation using the segment table 110 can be executed more rapidly in practice by using the memory 11.

Next, the operation of the apparatus shown in FIG. 1 will be described briefly.

(1) when one element of a partial array, e.g., A (I, J) of A (I, *) assigned to each element processor is to be accessed, the processing unit 1 executes an instruction for reading the virtual address of the segment to which the partial array data belongs from the array descriptor 120. In addition, the segment virtual address and the offset determined by the index J of the element A (I, J) to be read are added together to obtain a virtual address VA of the element and execute an instruction of a memory access. The upper bits of the virtual address VA are sent to the segment physical address memory 11 as a segment number SN to be translated into a segment physical address SP. The physical address SP and the lower bits w (called an offset) of the virtual address VA are added together by the adder 15 to generate a physical address RA and access the local memory 2. As described before, to the local memory 2 of each element processor, not only the data defined by a task assigned to the element processor but also the data defined by other element processors may be assigned in some cases. The latter data can be accessed in quite the same manner as above. As seen from the above, an arbitrary array element required by a task assigned to each element processor can be read from and written in the local memory 2 of the element processor. However, in case where data is to be accessed whose element number to be accessed becomes definite during execution as in the array expressed by an indirect index, task program may read from or write in the local memory 2 of another element processor by the manner described later in some cases.

(2) If the memory access instruction is a data write instruction into the local memory 2, the corresponding entry of the segment physical address memory 11 is checked to judge if the data to be written is copied to another element processor or not. If it is to be copied, the fan-out memory address FOMA of the entry in the memory 11 is used to read the element processor number PE and the segment virtual address from the fan-out memory 20. The sum of the segment virtual address SV and the offset w of the virtual address VA designated by the instruction is obtained by the adder 21. Using the obtained sum as a virtual address for the copy data, the sum and the written data are sent to the element processor having an element processor number PE. If a plurality of element processor numbers at the copy destination are stored in the fan-out memory 20, a similar copy operation is conducted for each element processor. With the above operation, distributed memories each having a copy of the data can be renewed through write-through.

(3) If the memory access instruction is a data fetch instruction, address translation for the access of the local memory 2 is performed in the similar manner as above. However, a copy operation is not performed.

Figure 5:
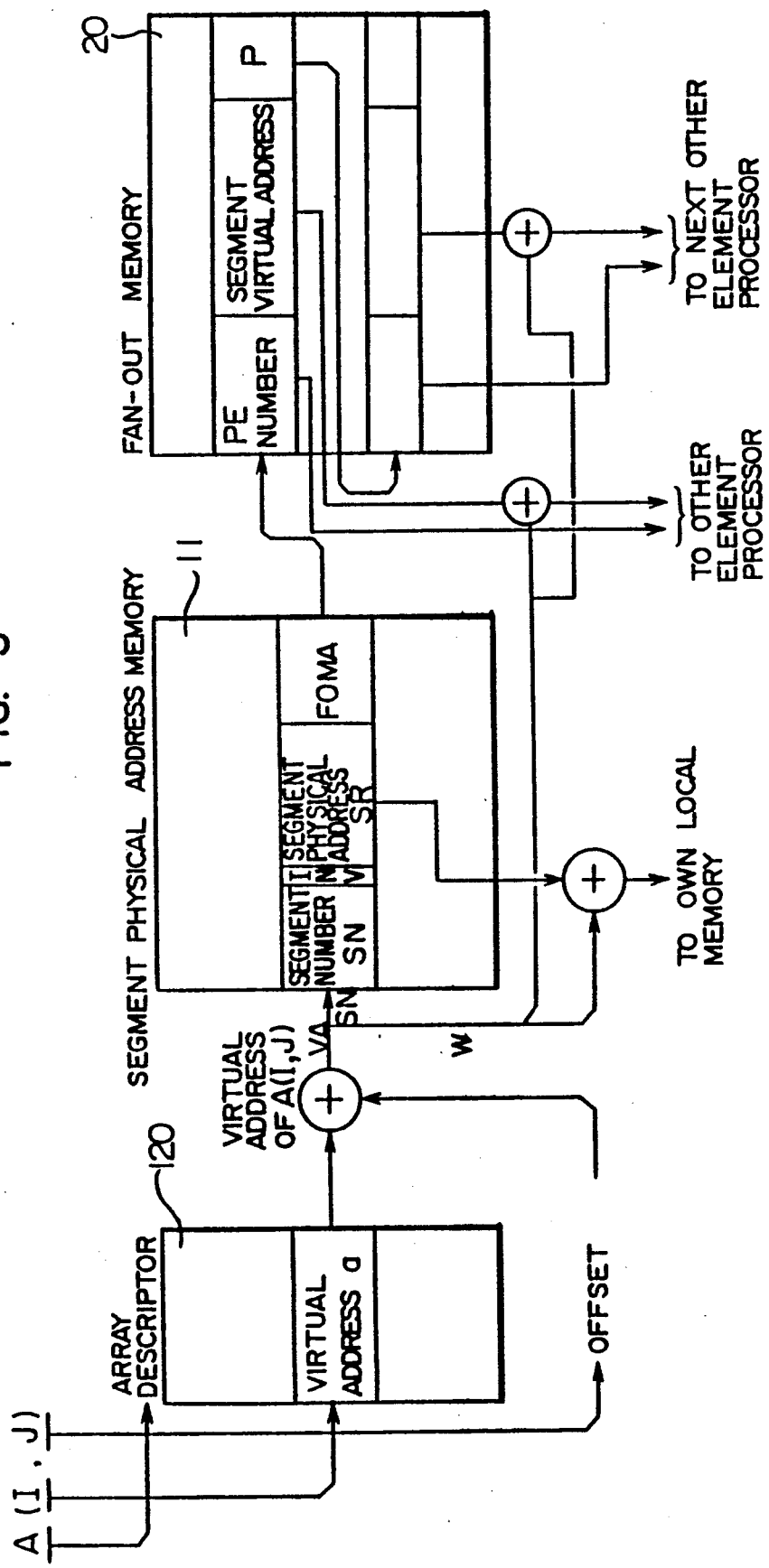
FIG. 5 shows a flow of address translation and virtual address generation for another element processor of the computer shown in FIG. 1.

(4) If a physical address corresponding to a virtual address designated by the memory access instruction is not assigned to the element processor; i.e., if an indirect index is used for the access, or if the data defined by another element processor is not copied for the sake of memory capacity saving, the data is not assigned to its own memory although it is assigned on the virtual space. In this case, however, if an access instruction to the data is executed, the invalid bit INV of the second field 11-2 of the entry in the segment physical address memory 11 is "1", indicating that the data is not assigned to the local memory 2. In such a case, the fan-out memory address in the next field 11-3 is used to access the memory 20 and read the number PE of another element processor assigned with the data and the segment virtual address SV of the data. The sum of the offset w of the virtual address VA designated by the instruction and the segment virtual address SV are obtained by the adder 21. The obtained sum is sent to the element processor of number PE as a virtual address VA of the data to be accessed, to thereby request a data write or a data fetch to the element processor. The above address translation from a virtual address to a physical address or the generation of a virtual address in another element processor are schematically shown in FIG. 5.

Next, the operation of the apparatus shown in FIG. 1 will be described more in detail.

(I) First, the operation of a data write instruction executed by the processing unit 1 will be described, taking as an example a task of an element processor of FIG. 1 writing the values of an element A (I, J) into the local memory 2.

(1) Prior to the execution of a data write instruction, the processor 1 executes an instruction for obtaining a segment virtual address for the partial array data A (I,

*) including the element concerned where * represents J = 1 to N, based on the array descriptor 100 in the local memory 2. On executing the data write instruction, an offset designated by the index J is added to the segment virtual address to output the virtual address VA of the element onto the address bus 9. The data A (I, J) to be written is outputted onto the data bus 10, and a write instruction signal onto the control bus 8.

(2) It can be considered that the upper bits of the virtual address VA represent the number SN of the segment belonging to the address, while the lower bits represent an offset w within the segment. The Segment number SN of the virtual address VA outputted onto the address bus 9 is inputted to the segment physical address memory 11, and the offset w into the address register 17 and the address adder 15.

(3) The inputted segment number SN is compared with a plurality of segment numbers by the memory 11 to detect the segment number with a same number and a "0" invalid bit INV. If such a segment number is not detected, an inequality signal is inputted from the memory 11 to the processor 1 via the control bus 9, which signal is received as an interruption. Therefore,, with an interruption processing program, information on the inputted segment number SN in the segment table 110 of the local memory 2 is read out to be stored in an entry of the segment physical address memory 11 via the write controller 14. Thereafter, the above-described comparison is resumed at the memory 11. If the comparison results shown that the invalid bit is "0" and a segment number has been detected, a segment physical address SP for the entry of the detected number in the third field is inputted to the address added 15, and the address in the fourth field into the fan-out memory address register 16 and the comparator 23. The contents of the second field are inputted to the encoder 24. The obtained segment physical address SP is added to the offset w in the segment by the address adder 15 to obtain a physical address PA of the data to be written. Based on the physical address PA, the values of the element A (I, J) are stored in the local memory 2.

(4) At the same time, it is checked if the contents of the fourth field outputted from the segment physical address memory 11 are "0" or not at the comparator 23. It is assumed that if "0", the address of the memory 20 is not written in the fourth field. If the address is written in the memory 20, the comparator 23 outputs "1". In this case, a copy operation is carried out in the following manner.

(5) The encoder 24 inputted with an output from the comparator 23, a control signal from the processing unit 1 via the control bus 8 and an invalid bit INV from the second field of the segment physical address memory 11, outputs signal "1" to the fan-out controller 25 and the OR gate 13 on condition that the comparator output is "1", the control signal is a write instruction signal and the invalid bit is "0". Then the fan-out controller 25 becomes busy. During a busy state, the fan-out controller 25 becomes not acceptable of a signal from the encoder 24, and outputs "1" to the OR gate 13. The output "1" from the OR gate 13 is inputted to the processing unit 1 via the control bus 8 as an operation stop signal. The operation of the processing unit is temporarily stopped completed and the output from the encoder 24 becomes "0". In each entry of the fan-out memory 20, there are provided an area 20-1 for storing another processor number PE to which the written data is to be copied, an area 20-2 for storing a virtual address SV of a segment, assigned for the copy data, in the local memory of the element processor, and an area 20-3 for storing a pointer P indicating the input address of the fan-out memory storing a next copy destination among a plurality of copy destinations. The fan-out controller 25 reads the information in the entry designated by the address FOMA in the fan-out memory address register 16. The virtual address SV of a segment assigned for the copy data together with the offset W within the segment in the address register 17 is inputted to the address adder 21. An output of the adder represents a virtual address VA of the copy data, which together with the written data in the register 18 and the element processor number PE of a copy destination read from the fan-out memory 20 is sent to the output port register 26. The fan-out controller 25 generates a write code "WRITE" based on the write instruction signal on the control bus 8 and write it in the output port register 26. Thus, a write packet shown in FIG. 6A is formed in the output port register 26. The controller 25 activates the transmitter 5 to instruct it a delivery of the packet. This write packet is sent to an element processor designated by the element processor number PE in the packet via the interconnection network 7.

(6) If the pointer p read from the fan-out memory 20 is not a predetermined address, e.g., "000 . . . 0" then the fan-out controller 25 reads again the content of another entry of the fan-out memory 20 having the address indicated by the pointer p. Based on the read contents, a similar operation to the above-described write packet sending operation is performed. This operation continues until a newly read entry pointer p becomes equal to "000 . . . 0". Thereafter, the fan-out controller 25 outputs "0" to the OR gate 13 as a calculation end signal. This end signal is ORed with an output from the encoder 24, i.e., "0" to release to operation stop signal of the processing unit 1. Therefore, the processing unit 1 again starts operating During such period the processing unit is in a frozen state, and although there is an idle time the operation thereof continues as if the processing unit has not been interrupted apparently. The fan-out controller 25 is also released from its busy state.

(7) When the receiver 6 of the element processor at the copy destination receives a packet from the interconnection network at the input port register 28, the received packet controller 30 decodes the contents of a process code in the packet. If the process code is "WRITE", a bus request signal is outputted onto the control bus 8. When a bus enabled signal is outputted from the processing unit 1, the received packet controller 30 outputs a bus busy signal and sends the virtual address VA in the packet to the segment physical address memory 11 via the address bus 9, and the data onto the data bus 10. The segment physical address memory 11 translates the received virtual address into a physical address, in quite a same manner as of the virtual address sent from the processing unit 1. The received data is stored in an area of the local memory designated by the translated physical address. Thereafter, the output of the bus busy signal is terminated to thereby give the privilege of bus use to the processing unit. The data copy is thus completed.

(II) Next, the operation of the execution of a data read instruction by the processing unit of each element processor will be described. If an element of partial array data assigned to the local memory 2 or the other data is to be read, the virtual address VA designated by the instruction is translated into a physical address in the same manner described before. In this case, obviously, a copy operation is not needed. As an example, array data A (L(I), J) expressed by an indirect index will be read in the following description.

(1) It is assumed that the indirect index L(i)=k is obtained during the execution of a task for the index I=i by the processing unit 1 of an element processor. A top address SV of a segment corresponding to the contents of an array descriptor 120 obtained using the index k, i.e., corresponding to the partial array A (k, *) where * covers all Js, is read. An offset address from the top address defined by the index J is inputted in one of the general-purpose registers of the processing unit 1. A virtual address VA of the data for use in fetching the partial array is outputted using the top address SV and the offset address. The above operation is the same as of the write operation into the local memory.

(2) If the data A (k, J) to be read is present in the local memory 2 of the element processor concerned, the virtual address VA is translated into a physical address in the similar manner to the case of storing data. The contents of the local memory 2 read by using the physical address are outputted onto the data bus 10. That the data is present in the local memory of the element processor concerned is notified by the "0" bit of the invalid bit INV of the segment physical address memory 11. In this case, the signal read from the control bus 8 and the invalid bit INV (=0) from the segment physical address memory 11 are inputted to the encoder 24 so that an activation signal "1" is not outputted to the fan-out controller 25.

(3) If the data A (k, J) is not present in the local memory 2 of the element processor concerned, an invalid bit INV (=1) is set at the entry corresponding to the segment belonging to the virtual address VA from the processing unit 1 in the segment physical address memory 11. This invalid bit INV is outputted from the segment physical address memory 11 to the control bus 8 as an interruption signal. If the processing unit 1 is executing a fetch instruction, an interruption is enabled to activate the interruption processing program. In this case, the processor number of an element processor assigned with A (k, *) and a virtual address SV of a segment assigned with the data are read from the entry of the fan-out memory 20 designated by the fan-out memory address in the fourth field 11-4 of the segment physical address memory 11. The signal read from the control bus 8, the invalid bit INV (=1) and the output (=1) from the comparator 23 which indicates that the address of the memory 20 is written in the fourth field of the segment physical address memory 11 are inputted to the encoder 24 so that a signal "1" is outputted to the fan-out controller 25 and OR gate 13. In this case, the output "1" from the OR gate 13 does not effect the processing unit 1 interrupted. The fan-out controller 25 inputted with an activation signal from the encoder 24 instructs the transmitter 5 to produce and send a READ packet as shown in FIG. 6B to the element processor assigned with A (k, *). Namely, the fan-out controller 25 reads the fan-out memory 20 by using a fan-out memory address outputted from the segment physical address memory 11 to the fan-out memory address register 16 Of the read contents, the element processor number PE is inputted to the output port register 26, and a segment virtual address SV to the address adder 21. An offset w within the segment in the address register 17 is inputted to the address adder 21 and added to the segment virtual address, the result of which is outputted to the output port register 26. The fan-out controller 25 also generates a process code "READ" and its own processor number, based on the fetch signal from the control bus 8, to output them to the output port register 26. The thus constructed read packet on the output port register 26 is sent by the transmitter to the interconnection network 7.

At the element processor receiving the READ packet, the receiver 6 receives the packet at the input port register 28. The received packet processing controller 30 immediately decodes the process code and take the privilege of bus use from the processing unit 1. In case of the READ code, a virtual address in the packet is inputted to the segment physical address memory 11 where at the virtual address is translated into a physical address of the local memory 2. Using the physical address, the contents at the corresponding area of the local memory 2, i.e., the data A (k, J) is read. The values of the data are stored in the return packet output port register 31. The received packet processing controller 30 also causes the return element processor number in the input port register 28 to be stored in the return packet output port register 31. The controller 30 also generates a code "RETURN" to store it in the return packet output port register 31. Thus, a RETURN packet as shown in FIG. 6C is formed in the return packet output port register 31. The receiver 6 instructs the transmitter 5 to output the packet to the interconnection network 7 and return it to the element processor on the request side.

When the RETURN packet reaches the element processor on the request side, the received packet processing controller 30 performs similar processing to that of a WRITE packet. However, if the process code decoded at the received packet processing controller 30 is discriminated at a RETURN code, the controller 30 outputs a predetermined, specific and fixed address (return data buffer area address) in the local memory 2 to the address bus 9, to thereby store the received data at the area indicated by the address Also, an operation is added for notifying a reception of the data to the processing unit 1 via the control bus 8. Upon this notice, the fetch interruption processing program in the processing unit 1 changes the operand address of the interrupted data read instruction to the above-described specific address to restart executing the instruction Thus, the instruction reads the specific address without fail. As above, the data designated by an indirect index, not present in the local memory of each element processor, can be referred to.

(III) In case where the data not present in the local memory 2 is to be written in the operation (I), the invalid bit INV in the segment physical address memory 11 of the entry at the virtual address VA of the data is "1" which is supplied to the local memory as a control signal to inhibit the data store operation at the local memory 2 the fan-out memory address FOMA is not "000 . . . 0", so that the output from the comparator 23 is "1". At the element processor executing the write instruction, the invalid bit INV and an output (=1) from the comparator 23 are inputted to the AND gate 12 which in turn outputs "1" informing the processing unit 1 of the write operation at the other element processor.

In response to the invalid bit, the output from the comparator 23, and the write instruction signal on the control bus 8, the encoder 24 activates the fan-out controller 25. The controller 25 responsive to the write instruction signal on the control bus 8 generates a WRITE packet in the similar manner at the copy operation, and issues a write instruction by sending the data to be written to another element processor.

A second embodiment of the present invention will be described with reference to the accompanying drawings.

Referring to FIG. 7, a plurality of element processors 100 are coupled by an interconnection network 7 to effect mutual communication among them under a host computer 10. An element processor 100 comprises a processing unit 1 for executing a program instruction, a local memory 2 for storing a program and data, an address translator 60, a bus 74 connecting the above devices, a comparator 79, a fan-out memory 20, a packet generation controller 25A, an output port register 26, a bus 77 connecting the above devices 79, 20, 25A and 26, an input port register 28, a received packet processing controller 30A, a matching information storage 32, a subtracter 33, a bus 71 connecting the above devices 30A, 32 and 33, a bus switch 80B for connection between the buses 71 and 74, a bus switch 80C for connection between the buses 74 and 77, and a bus arbiter 80A.

The processing unit 1 has the same structure as that shown in FIG. 2, and the fan-out memory 20 stores addresses in another element processor and each entry has three fields similar to that shown in FIG. 1. However, the fan-out memory shown in FIG. 1 stores a segment address of data assigned to a virtual space of another element processor, whereas the fan-out memory in this embodiment stores the address of the local memory 2 and the address of the matching information storage, respectively of another element processor. The former address is used for data transfer similar to that shown in FIG. 1, and the latter address is used for the transfer of a control token.

Figure 8:
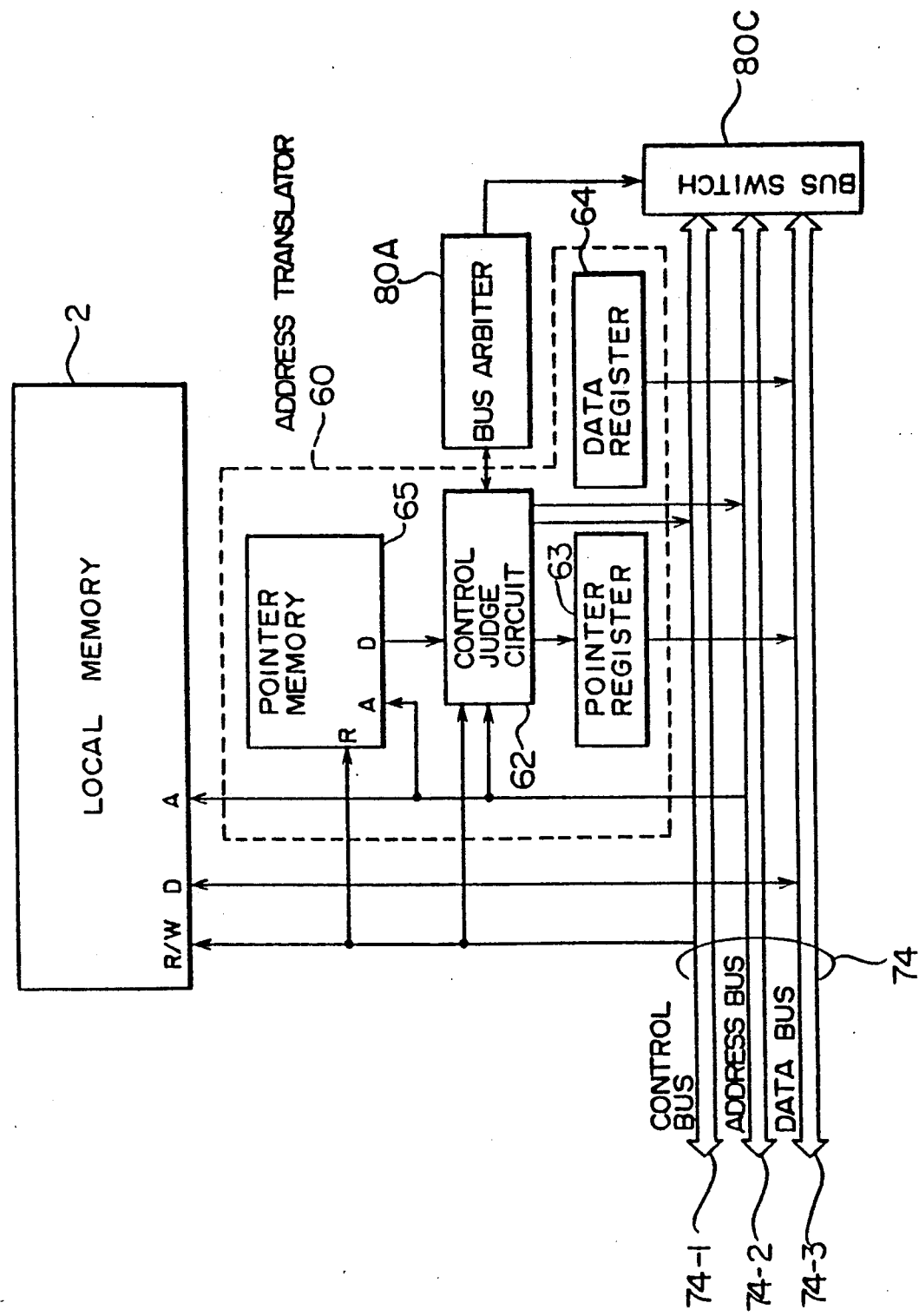
FIG. 8 is a schematic block diagram showing the address translator (5) of the computer shown in FIG. 7.
Figure 9A:
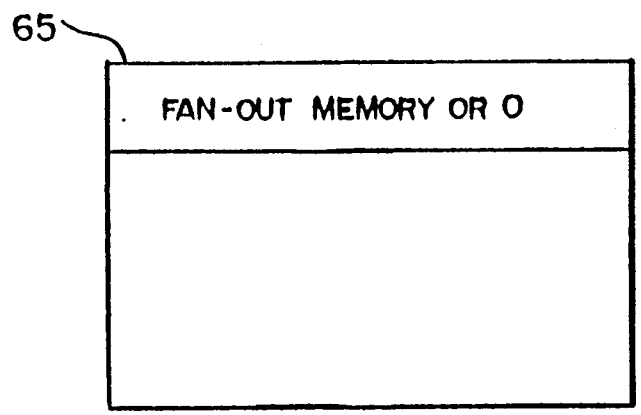
FIG. 9A shows the content of the fan-out memory (20) in the computer shown in FIG. 7.
Figure 9B:
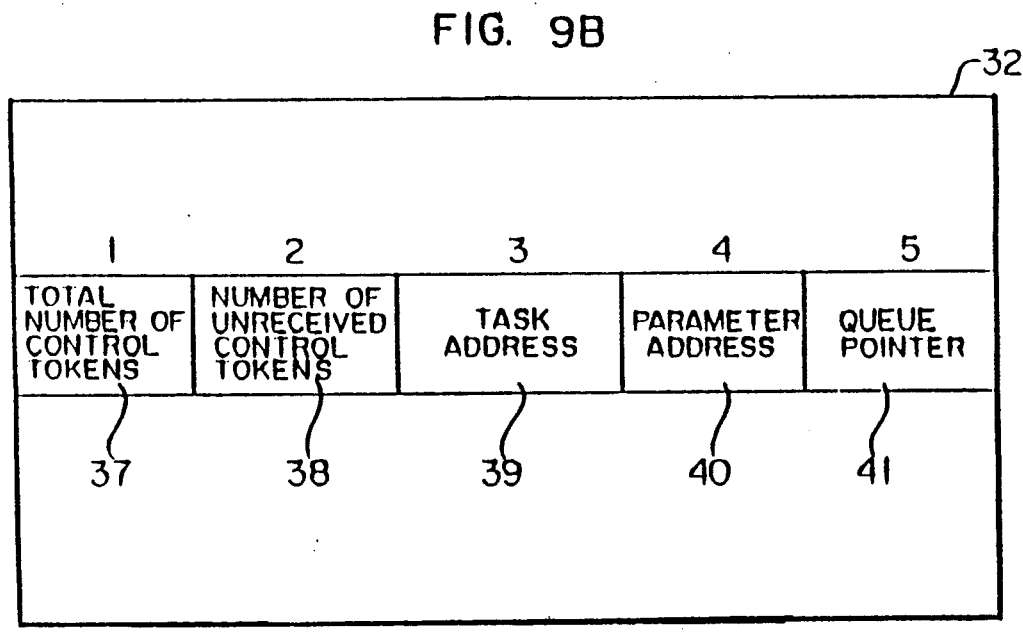
FIG. 9B shows the store content of the wait information storage (32) used by the computer shown in FIG. 7.

The address translator 60 is constructed of, as shown in FIG. 8, a control judge circuit 62, a pointer memory 65, a pointer register 63 and a data register 64. The pointer memory 65 functions similarly to the segment physical address memory 11 shown in FIG. 1. However, due to the reason described above, and each entry stores a pair of a physical address to be outputted after the translation and an address of the fan-out memory 20, but an address of the fan-out memory 20 only as shown in FIG. 9A. The address translator 60/fan-out memory 20 combination allows a data copy operation to distributed local memories and other operations similar to the embodiment of FIG. 1. The matching information storage 32 allows to perform activation management of tasks for each element processor. Namely, the matching information storage has one entry for each task assigned to the element processor, the contents of which are shown in FIG. 9B.

As compared with the embodiment shown in FIG. 1, the distributed local memories and data copy technology are adopted also in this embodiment, however, the virtual address space assigned to each element processor differs from the first embodiment. In particular, in this embodiment, a part of a virtual address space coincides with the physical address space. Therefore, if the address belonging to the part of the virtual address space is outputted from the processing unit 1, the address translation as described in the first embodiment is not necessary for this embodiment. Thus the pointer memory 65 stores only the address of the fan-out memory 20. Further, in this embodiment, a circuit for task activation control is provided to each element processor.

First, this embodiment will be briefly described. The host computer is programmed so as to execute the following operations. The plurality of programs made of source programs to be executed by the parallel computer, which are called tasks and need not be communicated with each other during the execution of the tasks, and necessary data (the details thereof will be later described) for the execution of the tasks, are located beforehand in the host computer 10. The host computer 10 then loads a plurality of tasks and necessary data for the execution of the tasks in each element processor. Thereafter, all the element processors are activated and the execution results thereof are outputted to an external apparatus (not shown). Each element processor is constructed such that it can execute a plurality of assigned tasks, in parallel with the execution by other element processors of other tasks assigned thereto.

The operation of each element processor will be described briefly as in the following:

A control token transfer instruction has been included previously by the host computer at the end (or intermediate) of each task. The packet generation controller 25A transfers a control token, in accordance with the instruction included in the task under execution by an element processor 100, to other executable tasks after the execution of the former task up to the control token transfer instruction. Such other tasks are previously determined for each element processor 100, the determination results being stored in the fan-out memory 20. The received packet processing controller 30A determines which task among those tasks assigned to each element processor 100 can the element processor execute. For the execution of a task by an element processor, it is necessary that all tasks to be executed prior to the task have been executed completely and that a control token indicative of such completion be notified to the element processor. To this end, each element processor holds the number of control tokens necessary for the execution allowance for each task in the matching information storage 32. After each element processor completes the execution of one task, the processing unit 1 executes one of the tasks which has been decided by the received packet processing controller 30A as executable. In particular, upon issuance of a task end instruction at the end of the program, the next task is fetched by a branch instruction. The branch destination address is obtained upon instruction from the information for initiating the executable tasks managed by the received packet processing controller 30A. As above, the present invention does not incorporate an operating system in order to switch tasks, thereby enabling a high speed operation.

Figures 13, 14:
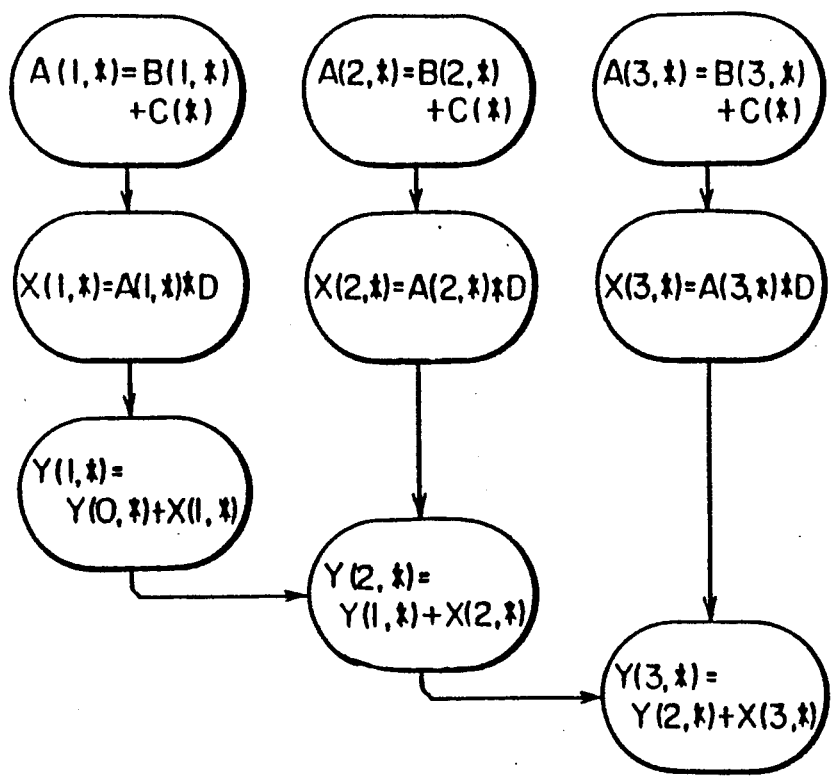
FIG. 13 shows an example of a Fotran program.
FIG. 14 is a task flow graph for the program shown in FIG. 13.

Each task is a unit process program which is constructed such that each task during execution needs not communicate with another task Therefore, each element processor 100 after the start of the execution of one task can execute it independently from the execution of a task by another element processor, i.e., it can execute it in parallel However, prior to the execution of a task, a predetermined task or tasks to be executed before that task should be executed completely. For example, the order of execution of a plurality of tasks obtained by dividing source programs shown in FIG. 13 is shown as a task flow graph in FIG. 14. In view of this, in this embodiment, a task is activated after checking whether or not a control token indicative of the execution completion of those tasks has been received by an element processor 100, thereby enabling to judge if a task is executable by an element processor 100.

Further, in this embodiment, in transferring data, i.e., in communicating among element processors, the processing unit 1 performs an ordinary memory access operation of storing and reading the data in and from the local memory 2, and necessary data communication is performed by the circuits associated with the address translator 60. In this embodiment, each element processor is assigned with a specific local address space. In accessing data by a task of each element processor 100, the task designates a local address corresponding to the data in the space. The space of a physical address of the local memory 2 corresponds to only a part of the local space, so that there is no area in the local memory 2 for the remaining addresses in the local space. Therefore, the local address can be considered as a virtual address similar to the first embodiment. On the other hand, the address space of the pointer memory 65 (FIG. 8) includes the address area of the local memory 2 and is broader than that. For example, assuming that the local address space is addressed by N bit addresses, the area of the physical address space of the local memory 2 is the area addressable by N−1 bits, i.e., half the local address space, and the area of the physical address space of the pointer memory 65 is the area addressable by N bits, i.e., the whole area of the local address space. Such multiple address spaces are set for each element processor. In this embodiment, data are distributively disposed on the multiple address spaces to enable the reliable and quick access to necessary data for an element processor.

The embodiment will further be described in more detail. First, the description is directed to the assignment of task and data to each element processor.

Figure 11:
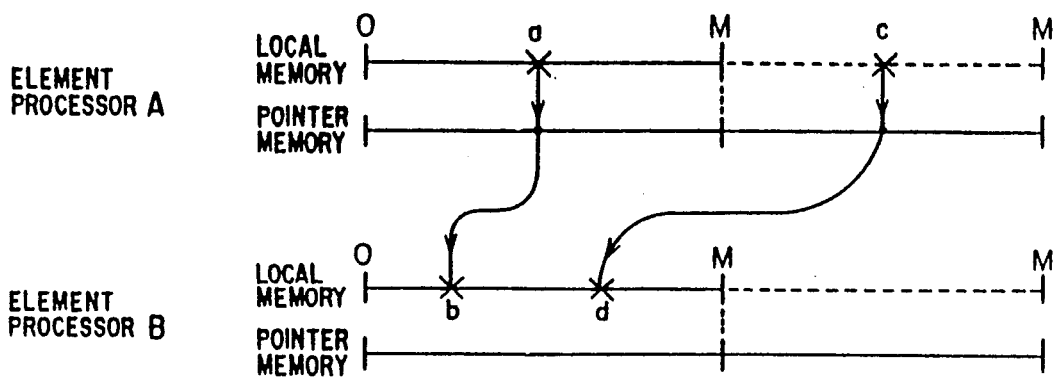
FIG. 11 shows an example of data assignment to different element processors in the computer shown in FIG. 7.

(a) Data and task defining the data are assigned to a same element processor (e.g., element processor A). The data is assigned within the area of the physical address in the local memory 2 of each element processor. For example, as exemplarily shown in FIG. 11, data defined by the task are assigned at the address a lower than address M, assuming that the physical address of the local memory is 0 to M and the local address space is 0 to M'.

(b) If another task, which was decided before the execution of the program to refer to the data, is being assigned to another element processor (e.g., element processor B), the copy data is assigned within the area of the local memory 2 of the element processor B, e.g., at address b.

(c) The address of the element processor (element processor B, address b) with the copy data assigned is stored in an entry of the fan-out memory 20 designated by the entry at address a of the pointer memory 65 of the element processor A. If the copy data is to be assigned to a plurality of element processors, the addresses of the copy data are stored in the fan-out memory 20 of the element processor A in the form of list interconnecting the addresses by pointers P, similar to the fan-out memory 20 shown in FIG. 1.

(d) The data which are indefinite as to the definition and reference relation before a program starts, are assigned to the element processors by suitable means (e.g., in the order of sequence). On the other hand, the data which are not assigned to element processors but are possibly defined or referred to, are assigned to element processors at the address (e.g., address c of the element processor A) outside of the address area (e.g., between M +1 to M' shown in FIG. 11) of the local memory 2 within the local address space.

(e) A real location (element processor B, address d) of the data virtual assigned at address higher than address M at the above process (d) is stored in an entry of the fan-out memory 20 of the processor A designated by the entry at address c of the pointer memory 65.

Figure 12:
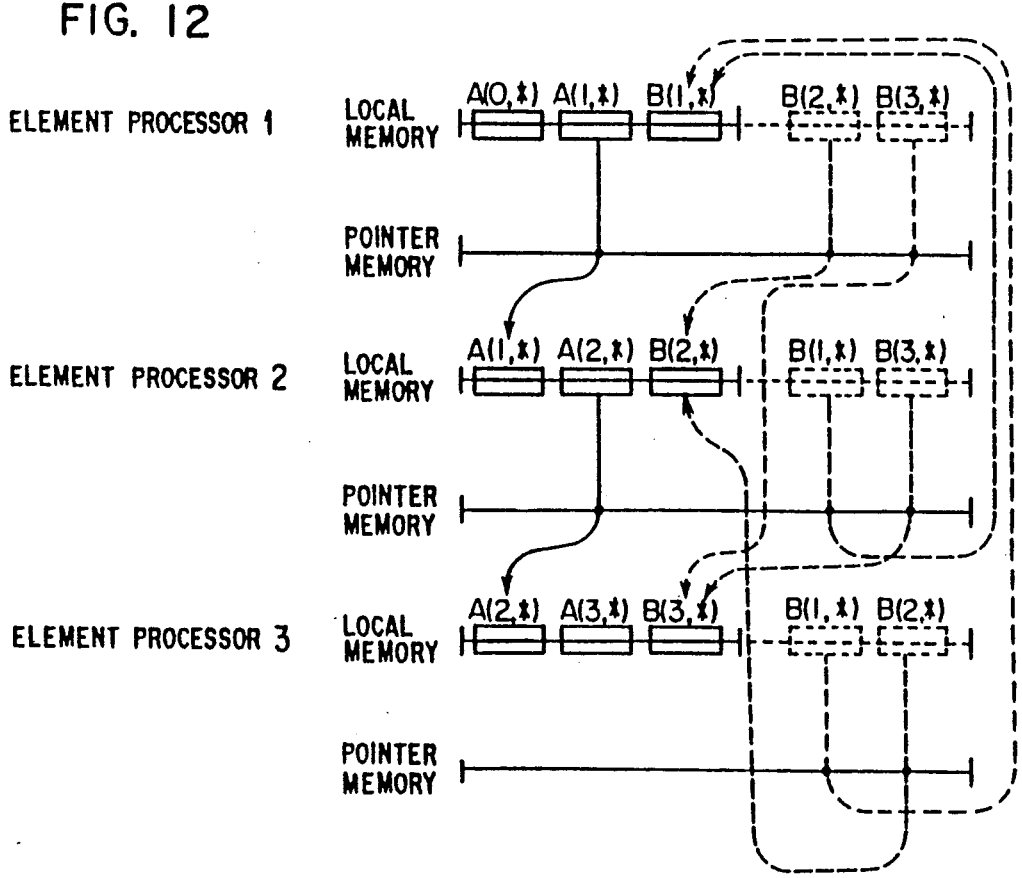
FIG. 12 shows an example of array data assignment in the computer shown in FIG. 7.

The following program is now considered as an example of the above processes (d) and (e):
DO 10 I=1, 3
DO 10 J=1, 3
A (I, J)=A {I−1, J)+B (L (I), J)
10 CONTINUE The program is divided with a respect to I, and it is assumed that three element processor execute the task in parallel and each element processor executes the following tasks:
K=L (I)
(displacement address of B=BD (K))
DO 10 J=1, 3
A (I, J)=A (I−1, J)+B (J)
10 CONTINUE The sentence in the parentheses is a newly produced execution sentence, wherein BD (K) is a table storing the top addresses (displacement addresses) of partial array B (K, *). The program is definite with respect to the definition and reference relation of A, but indefinite to B, so that a copy address of B cannot be determined beforehand. In such case, B (K, *) is arbitrarily assigned to each element processor 100 as shown in FIG. 12, and the data not assigned are assigned outside of the local memory 2 (within the area of the pointer memory 65). If it is decided L (I)=(3, 2, 1) during the execution, necessary data can be accessed by an arbitrary element processor as indicated by broken lines. For example, the element processor 3 executes the following program:
I=L (3)
(displacement address of B=BD (1))
DO 10 J=1, 3
A (3, J)=A (2, J)+B (I, J)
10 CONTINUE In this case, A (3, J) and A (2, J) can be found in its own local memory. However, B (1, J) is present only in the pointer memory 65 so that the local memory 2 of the element processor 100 is accessed via the pointer memory 2 of another element processor 100, a READ packet issues upon instruction by the address translator 60. On receipt of this packet, an element processor returns a RETURN packet. During this process, the processing unit 1 is waiting for a return message and is not required to execute a communication instruction. In the above memory system, same data are coupled by pointers so that the data can be accessed even they are present in physically different locations. Further the data not present in the local memory 2 of the element processor, can be accessed if they are assigned to the pointer memory 65. In reading the data, one of the data present in different locations may be accessed, whereas in renewing the data, all the data must be renewed with the help of pointers.

Use of such memory system presents the following advantages:

(1) Since data can be distributively arranged such that any element processor can access the data, access collision becomes less than that as in a centralized memory arrangement by which all the element processors can directly access the data.

(2) It is possible to store the data to be accessed in the local memory 2 of an element processor which executes the task, on condition that an access pattern is recognizable before execution of a program.

(3) The data storage area can be assigned to the local memory 2 of the element processor requiring the data so long as an element processor can be identified beforehand, and the data can be transferred to the area at the time the data is produced. Therefore, the time required for executing an instruction can be shortened, as compared with the case where an activated task reads the data from the local memory of another element processor after decoding the instruction.

If a plurality of same logical data are present physically the logical correctness of the access cannot be ensured in general unless the definition is performed at physically the same time. For example, there is a problem of "read before write" reading erroneously the data before it is renewed, or conversely "write before read". In this embodiment, this problem is essentially avoided because of the introduction of the fundamental architecture that a task accessing data activates another task consecutively accessing the same data, by using a control token.

Next, a write operation of data to a local memory 2 will be described referring to FIGS. 1 and 8.

(a) Data Write to Local Memory of Its Own Element Processor & Data Copy to Local Memory of Another Element Processor After the processing unit 1 executing a task decodes an instruction of storing data in the local memory 2, (1) the processing unit 1 delivers the address and data onto the address bus 74-2 and data bus 74-3 of the bus 74, and a write instruction signal onto the control bus 74-3. The local memory 2 is connected to these busses as in case of an ordinary memory. On the other hand, the READ terminal R of the pointer memory 65 is inputted with both a write instruction signal and a read instruction signal on the control bus 74-1 to output its contents on the DATA terminal D. The terminal D is connected to the pointer register 63 through the control judge circuit 62 which judges if the entry of the pointer memory 65 is empty or not. The data bus 74-3 is connected to the data register 64 to set the data each time the execution of a store instruction is performed. (2) At this time, the data is stored in the local memory 2 at the area indicated by the address outputted onto the address bus 74-2. (3) At the same time, the contents in the pointer memory 65 at that address are read and sent to the control judge circuit 62, and stored in the pointer memory 63 if not empty. (4) The control judge circuit 62, if not empty, sends a stop signal to the processing unit 1 to stop the operation, (5) and requests the bus arbiter 80A to release the bus 77 in order to activate the packet generation controller 25A. (6) When the packet generation controller 25A becomes not busy and the bus 77 is released, it allows to write the contents of the pointer register 63 into the register 41 and then the contents of the data register 64 into the register 42, using the released bus, to thereby notify the packet generation controller 25A of the write operation. (7) Thereafter, a signal is sent to resume the operation of the processing unit 1.

The packet generation controller 25A (1) upon reception of a write instruction signal, confirms that the contents of the register 42 do not represent a control token code and thereafter, (2) using the contents of the register 41 as an address, accesses the fan-out memory 20 to store a destination address in the register 44A and a pointer indicative of the entry of the memory 20 storing the next destination address into the register 44B. (3) The packet generation controller 25A also causes the data in the register 42 together with a process code (WRITE) generated by the controller 25A to be transferred into the output port register 26, to form a write packet of the same format as shown in FIG. 6A. (4) The packet generated as above is sent to the interconnection network 7 and processing for it is performed. Namely, if the contents of the pointer placed in the register 44B are not empty (predetermined bit train, e.g., 000 . . . 0), the entry of the fan-out memory 20 at the address is accessed to fetch the next destination to form the same packet as the previous one with a different destination.

(b) Data Write to Local Memory of Another Element Processor

If an address designated by a data store instruction is outside of the address area of the local memory 2, the control judge circuit judges such a case and a write operation to the local memory 2 is not performed, but a transfer operation of a write packet to another element processor is executed similar to the above copy operation and the data is written in the other element processor. Namely, the address translator 60 (1) first sends a stop signal to the processing unit 1 to stop the operation thereof, and thereafter (2) confirms an empty state of the packet generation controller 25A by means of the arbiter 80A, (3) and using the bus 77 connected by the arbiter 80A, sends the address of the fan-out memory 11 (storing the address of the copy data area) to the register 41 and writes the data on the bus 74 to be transferred into the register 42, (4) notifies the packet generation controller 25A of a write operation and thereafter, (5) releases the stop of the processing unit 1. The packet generation controller 25A produces and outputs the WRITE packet in the similar manner at (a).

(c) Data Write for the Data sent from Another Element Processor

The received packet processing controller 30A with a write packet received (1) sets a local memory address in the packet into the address register 34A, stores the data in the packet into the data register 34B and simultaneously therewith, (2) sends a bus request to the bus arbiter 80A. The bus arbiter 80A (1) waits for a release of the bus 74 and (2) turns on the bus switch 80B to release the bus 74 to the receiver packet processing controller 30A which, (3) using the released bus, causes to store the contents of the data register 34B in the area within the local memory 2 indicated by the contents of the address register 34B, (4) and returns a privilege of using the bus to the processing unit 1.

(d) Data Read for the Data in Local Memory of Its Own Element Processor

As the processing unit 1 decodes an instruction of reading data in the local memory 2, (1) the control judge circuit 62 checks if the address does not exceed the address area of the local memory 2, (2) if not, the local memory is accessed using the address.

(e) Data Read for the Data in Local Memory of Another Element Processor (1) In case (d), if an address on the address bus 74-2 excesses the address area of the local memory 2, (1) the control judge circuit 62 interrupts the processing unit 1 by way of the control bus 74-1 to activate an interruption processing program. The program changes the operand address of the read instruction to a specific address (address of the reception buffer), to wait for a notice of arriving a return packet. (2) Next, the bus switch 80C is connected to write the contents of the pointer register 63 in the register 41, and a READ code generated in correspondence with the read instruction signal into the register 42. As already described, the packet generation controller 25A accesses the fan-out memory 20 using the contents of the register 41 to send the READ packet of the same format as shown in FIG. 6B to the element processor having the data concerned.

(2) Reception of READ Packet and Its Processing

If a process code 28A of a received packet is READ, the received packet is a data read request packet (READ packet). The received packet processing controller 30A (1) stores a local memory address in the packet in the address register 34A and at the same time, (2) sends a bus request to the bus arbiter 80A. The bus arbiter 80A (1) waits for a release of the bus 74, and (2) connects the bus switch 80B to release the bus 74 to the received packet processing controller 30A. The controller 30A using the released bus (3) reads the local memory area indicated by the contents of the address register 34A to load it in the data register 34B, and (4) returns a bus use privilege to the processing unit 1. The controller 30A (5) also causes the packet generation controller 25A to wait for the output port register 26 until it becomes empty. (6) The received packet processing controller 30A stores the destined element processor number in the READ packet, the contents of the data register 34B and a RETURN code generated in response to the READ packet reception into the output port register 26 via a bypass 29, and sends the RETURN packet in the register 26.

(3) Reception of RETURN Packet and its Processing

In case where a process code =RETURN, the received packet is a return data store request packet (RETURN packet). The processing for this is similar to that of the WRITE packet. The difference is that the packet is stored at a predetermined, specific and fixed address of the local memory, and an operation of notifying the processing unit 1 of the arrival of data using the bus 74 is added. Upon this notification, the processing unit 1 resumes the once interrupted data read instruction. In this case, the above specific address is always read because the interruption processing program has changed the operand address.

Figure 10:
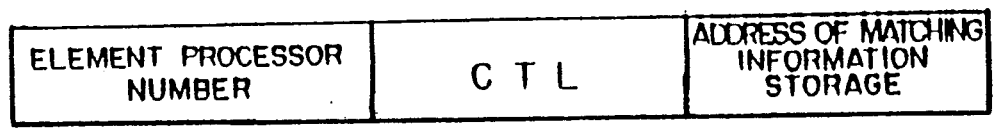
FIG. 10 shows a format of a control token packet used by the computer shown in FIG. 7.

The task activation control will be described hereinafter. (a) A task executed by the processing unit 1 sends, when the data definition and storing instruction has been executed completely, a control token associated with the data to a following task or task group generally at the end of the task. Thus, a control token transfer instruction is executed. The processing unit 1 after decoding the control token transfer instruction (1) causes the bus arbiter 80A to check if the packet generation controller 25A is allowed to receive an instruction or not and thereafter, (2) under control of the bus arbiter 80A, reads the entry address of the fan-out memory 20 using the specific address of the local memory 2 via the bus 77 connected to the bus 74 by the bus switch 80C, and sets the entry address at the register 41 and writes the code CTL representative of a control token into the register 42. The entry of the fan-out memory 20 holds the numbers of element processors assigned with succeeding tasks to be executed after the completion of a task, and the entry number in the matching information storage 32 corresponding to the succeeding tasks. The above specific address is held in the fourth field 40 of the entry corresponding to the completely executed task in the matching information storage 32. Therefore, the processor can recognize the specific address by reading the contents of the fourth field. (3) At the same time, the packet generation controller 25A is notified of the write operation. (4) The fan-out memory 20 is provided at least one entry in correspondence with a task assigned to the element processor. Each entry stores the numbers of element processors assigned with a task to be executed after the execution of the task by the element processor concerned, and the number of an entry storing the information on the task in the matching information storage of the element processor. If a plurality of succeeding tasks are present, the fan-out memory 20 has an entry for storing the information on each succeeding task, the entry storing pointers indicative of the numbers of other entries. The above entries are accessible using these pointers. Returning back to the operation, upon reception of the above-described write notification signal, the packet generation controller 25A accesses the entry of the fan-out memory 20 designated by the register 41 to read a destination address of the control token (the number of an element processor and the address of the matching information storages) and set them at the register 44A and the output port register 26, and also stores the pointer in the entry indicating the other entry in the register 44B. The packet generation controller 25A (5) also sends in response to the write notification signal a process code (CTL) indicative of a control token to generate a control token packet as shown in FIG. 10 and sends it to the output port register 26. (6) The packet generation controller 25A compares the element processor number constituting a part of the destination address with its own element processor number by the comparator 79 to check if the destination is its own element processor. (7) If the destination is its own element processor, the packet generation controller 25A confirms if the input port register 28 is empty by instructing the received packet processing controller 30A to check such effect. Thereafter, the packet in the output port register 26 is sent to the input port register 28 through the bypass 29. (8) In case of other element processors, the packet generation controller 25A sends a control token packet in the output port register 26 onto the interconnection network 7. Thereafter, (8) if the contents of pointers in the register 44B are not empty (a predetermined bit train, e.g., 000 . . . 0), the entry of the fan-out memory 20 indicated by the pointer is accessed Lo obtain the next destination to again transfer a control token packet.

(b) Reception of Control Token Packet and its Processing

The received packet processing controller 30A (1) decodes, upon reception of the control token packet, the process code 28A in the packet, (2) and accesses the entry of the matching information storage 32 using the address of the matching information storage 32 in the packet. The entry of the matching information storage 32 is constructed of five fields as shown in FIG. 9B. The total number of tokens necessary for the activation of the task designated by the entry is stored in the first field 37, and the number of unreceived control tokens in the second field 38. Each time a control token packet is received, (3) the received packet processing controller 30 subtracts the contents of the second field 38 of the entry designated by the control token packet by 1 by using the subtracter 33. (4) When the contents becomes 0, the task is allowed to be activated. The contents of the tail pointer register 36 indicate the entry address of the matching information storage 32, corresponding to the last task among the tasks allowed to be executed. END is written in the fifth field 41 of the entry. The contents of the fifth field of the entry is renewed to the entry address in the matching information storage 32 corresponding to the task just become executable. The contents of the fifth field 41 represent a pointer field constructing a queue of entries of executable tasks. With this, the task become executable is linked to the queue. (5) The address of the entry in the matching information storage 32 corresponding to the task now linked to the queue and become executable is stored in the tail pointer register 36 to thereby (6) rewrite the contents of the fifth field 41 of the entry to END. The third field 39 stores the address of a program for executing the task, the fourth field 40 stores various parameters (such as base address, the address of one entry of the fan-out memory 20) to be supplied to the task. The head pointer register 35 stores the top or head address of the queue of executable tasks, i.e., the address of an entry of the task first become executable.

(c) Task Exchange Process

The processing unit 1 executes the task exchange process after the execution of a control token transfer instruction. In the task exchange process, a task program instructs the bus arbiter 80A to release the bus 71. Using the released bus, an instruction of reading the head pointer register 35 starts being executed. The processing unit 1 causes the total number of control tokens stored in the first field of the entry (corresponding to the top task in task array executable) in the matching information storage 32 designated by the head pointer register 35, to be transferred into the second field 38. Therefore, the entry of the task in the matching information storage 32 is reset to an initial condition. The processing unit 1 further makes the task address in the third field and the parameter address in the fourth field to be stored in a proper general-purpose register in the register group 56 (FIG. 2), and makes the queue pointer in the fifth field 41 to be stored as the entry address of the executable task into the head pointer register 35. Thereafter, using the general-purpose register set with the task address, a branch instruction is executed for branching to the address of a program executing the newly executable task, to thus start executing the instruction in the task.

Next, a third embodiment will be described.

Figure 15:
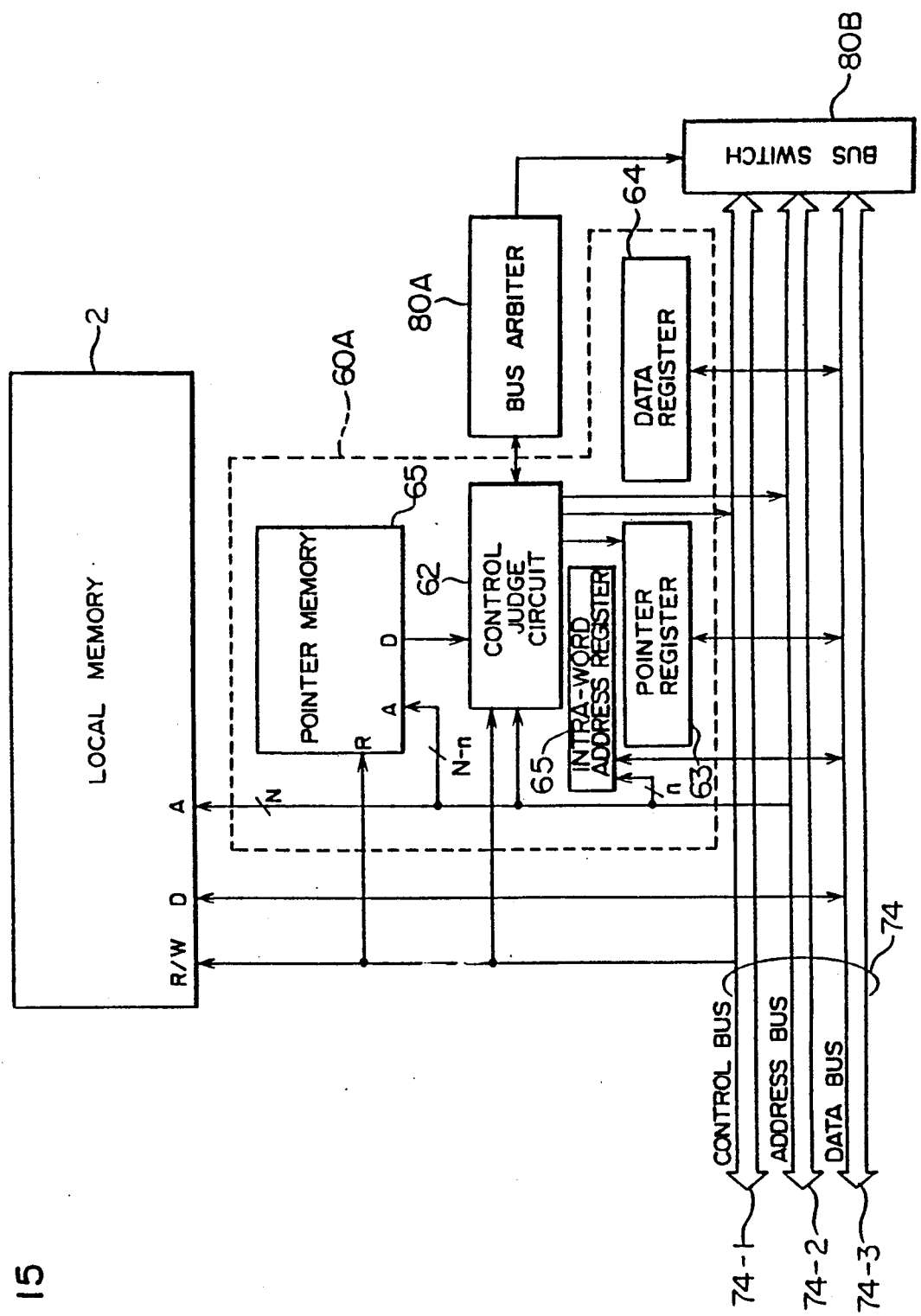
FIG. 15 is a block diagram showing the address translator (5) used by the third embodiment of the parallel computer according to the present invention.
Figure 16:
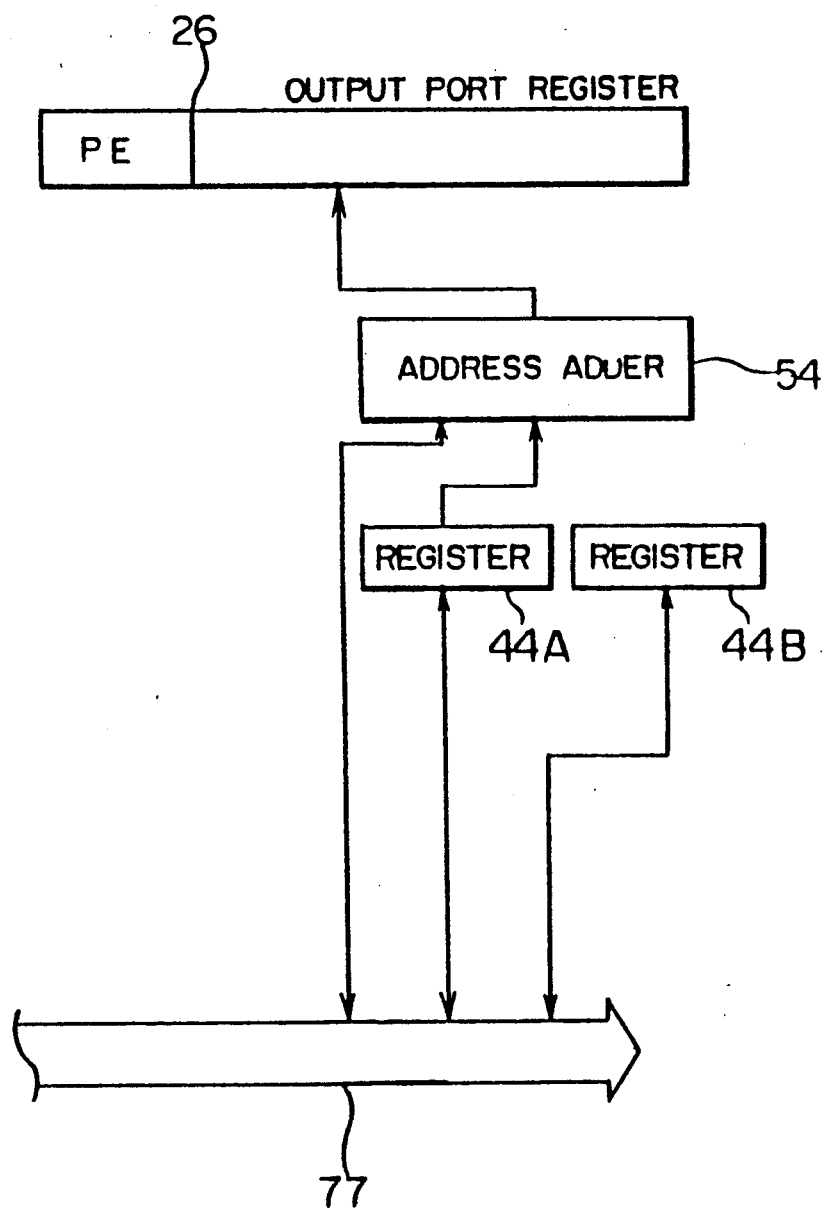
FIG. 16 is a circuit diagram in block form for generating packets used by the third embodiment.
Figure 17:
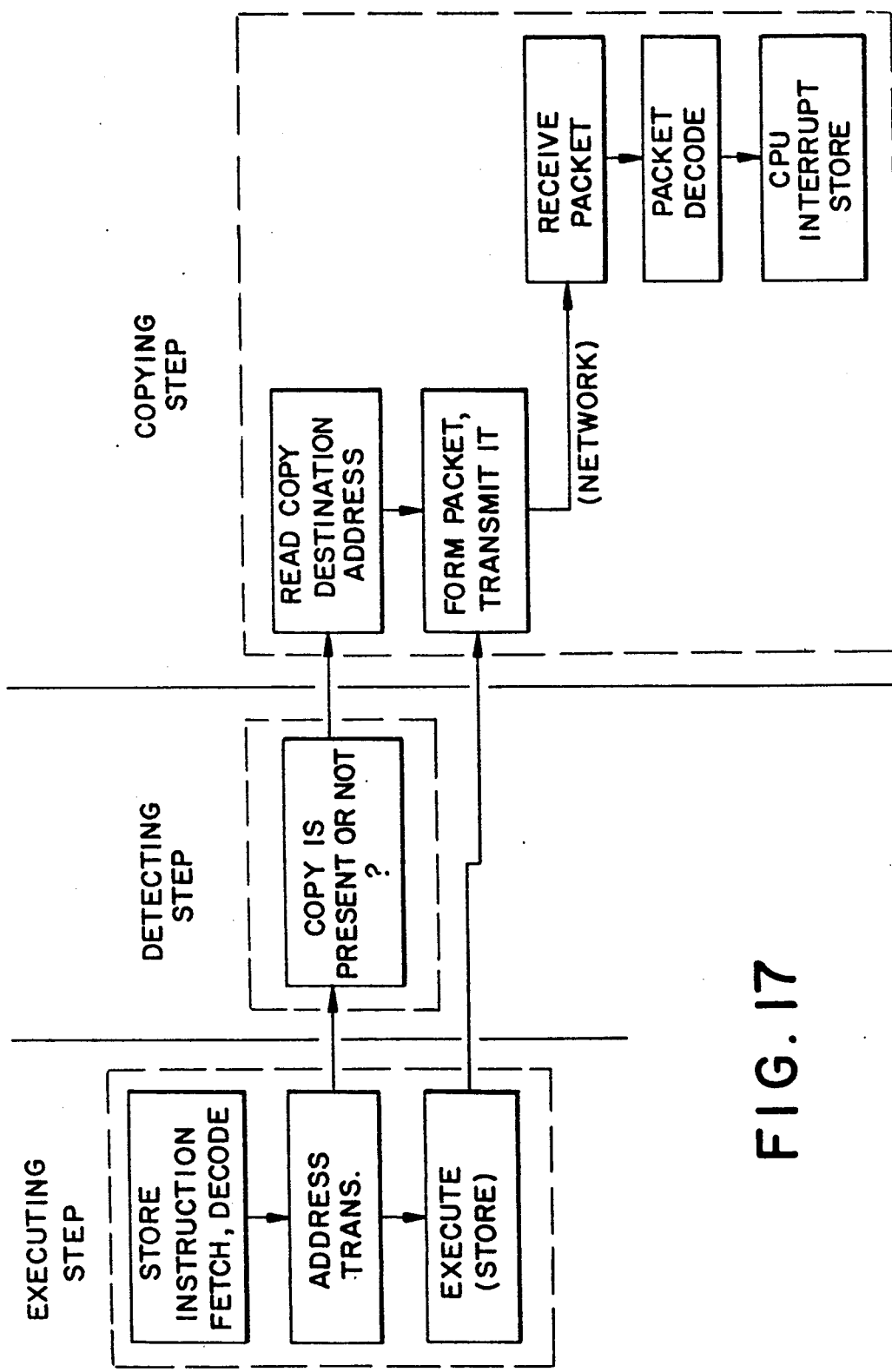
FIG. 17 is a diagrammatic illustration of a method of using the apparatus and software of FIGS. 1–5.

In this embodiment, the address translator 60A as shown in FIG. 15 is used. The difference from that shown in FIG. 8 is that an intra-word address register 65 is added. In addition, as shown in FIG. 16, an address adder 54 is provided between the register 44A and the output port register 26. In this embodiment, an address of an entry of the fan-out memory 20 is stored in the pointer memory 65, in correspondence to each data word among $2^n$ data words (n is an integer). Each entry stores the numbers of element processors having the copy data group for the above data group and an address (top copy address) assigned to the top copy data in the copy group. In particular, the data is copied as a lump segment of $2^n$ data words addressable in unit of a word. In this case, the method of reading the pointer memory 65 differs from the second embodiment only in that the bit train of an address generated by the processing unit 1 with the lower n bits removed is used in reading the pointer memory 65. The other points in this embodiment are the same as the second embodiment. The contents read from the pointer memory 65 are sent to the control judge circuit 62 and then to the pointer register 63, if the contents are not empty. The lower n bits (namely, intraword address) of an address generated by the processing unit 1 are stored in the intraword register 65, and the data in the data register 64. Then, the packet generation controller 25A (FIG. 7) is activated. Thereafter, the address translator 60A causes the contents of the pointer register 63 to be stored in the register 41 (FIG. 7), the contents of the data register 64 in the register 42 (Fig. 7), and the contents of the intraword address register 65 in the register 44A, to thereafter notify the packet generation controller 25A (FIG. 7) of a write operation. The circuit 25A reads the copy address from one entry of the fan-out memory 20 in the manner as already discussed in the second embodiment. Since this address represents a top address of the segment constructed of a copy data group, it is added to the contents of the register 44A at the address adder 54 to be converted into a destination address and the result is sent to the output port register 26, which is a different point from the second embodiment. The READ packet is also processed in a similar manner.

As described so far, in the second and third embodiments, a plurality of task programs assigned to a plurality of element processors are activated and executed while sending and receiving a control token to and from each other. Therefore, a distributed processing can be performed perfectly without causing an increase in control overhead due to a concentrated load of an increased number of element processors. Further, as different from a data flow machine, a program can freely handle the data in an array because of the incorporation of memory concepts as described with the first to third embodiments. Furthermore, in executing a data store instruction, the memory system side having the address translator as its main element communicates with other element processors in parallel with its task processing. Therefore, an instruction for communication processing is not needed to be executed, and an overhead of communication does not explicity appear except the case where a store instruction is executed continuously at short intervals to the extent that the transmitters become busy frequently. Thus, it becomes theoretically possible to run conventional programs without modifying them. In addition, according to the second and third embodiments, a task activation management is performed by matching for control tokens. In this case, if control tokens are driven in the order based on the data definition and reference relation, a data drive n control scheme is realized wherein the processing starts from a task first provided with data. An activated task has all necessary data, but the data can if possible. Therefore an instruction for communication processing is not necessary, thus realizing the most effective performance of the system.

According to the third embodiment, the copy address is managed in units of segment so that the capacity of the pointer memory 65 becomes advantageously smaller than the second embodiment.

What is claimed is:

1. A method of parallel processing in a computer having a plurality of communicatively associated and structurally similar elemental processors; each elemental processor having a local memory means for storing data and task programs, an execution means for executing the task programs; and a communication means for communicating data among the elemental processors, the method comprising the steps of:

executing one of said task programs in a first one of the elemental processors including accessing a first memory location of a first local memory means to write first data therein;

in accordance with information resident in the first local memory means and developed prior to the execution of the one task program indicating which of the processors will need the first data, detecting whether a copy area of the first data is present in local memory means of at least one indicated other elemental processor;

concurrently and in parallel with the executing of the one to write the first data into the first memory location, initiating a copy operation in which the first data is transmitted to the at least one indicated other elemental processor without any communication instructions; and, copying the first data into the copy area of the indicated other elemental processor local memory means such that the first data is copied before each indicated other elemental processor will use the first data to avoid access competition control problems and data updating problems that would occur with a shared processor memory, whereby improved processing speed is achieved.

2. A method of parallel processing in a computer having a plurality of communicatively associated and structurally similar elemental processors; each elemental processor having a local memory means for storing data and task programs, an execution means for executing the task programs and means operable in parallel with the execution means for communicating data among the processors, the method comprising the steps of:

executing a one of said task programs in a one of the elemental processors;

in accordance with information resident in the first local memory means and developed prior to the executing of the one task program indicating which of the processors will need a first data, detecting whether a copy area of the first data is present in a local memory means of the indicated other elemental processors;

in response to determining that the first data is not present in each indicated other elemental processor local memory means, transmitting the first data from the one elemental processor to the indicated other elemental processors with only a write instruction without any communication instructions; and, writing data into each indicated other elemental processor local memory means.

* * * * *

UNITED STATES PATENT AND TRADEMARK OFFICE
CERTIFICATE OF CORRECTION

PATENT NO. : 5,043,873

DATED : August 27, 1991

INVENTOR(S) : Akira Muramatsu, et al.

It is certified that error appears in the above-identified patent and that said Letters Patent is hereby corrected as shown below:

Claim 1, column 23, line 21, after "one" insert --program--.

Signed and Sealed this

Tenth Day of November, 1992

Attest:

DOUGLAS B. COMER

*Attesting Officer*     *Acting Commissioner of Patents and Trademarks*